United States Patent
Watanabe et al.

(10) Patent No.: US 12,001,759 B2
(45) Date of Patent: Jun. 4, 2024

(54) OPERATION DEVICE COMPRISING A HOUSING ARRANGED ON A CENTER CLUSTER

(71) Applicant: KABUSHIKI KAISHA TOKAI RIKA DENKI SEISAKUSHO, Aichi (JP)

(72) Inventors: Itaru Watanabe, Aichi (JP); Takao Imai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 18/189,034

(22) Filed: Mar. 23, 2023

(65) Prior Publication Data
US 2023/0325147 A1 Oct. 12, 2023

(30) Foreign Application Priority Data
Mar. 24, 2022 (JP) ................. 2022-047726

(51) Int. Cl.
| | |
|---|---|
| G06F 3/16 | (2006.01) |
| B60K 35/00 | (2024.01) |
| G06F 3/02 | (2006.01) |
| G06F 3/044 | (2006.01) |
| B60K 35/10 | (2024.01) |
| B60K 35/65 | (2024.01) |

(52) U.S. Cl.
CPC .............. *G06F 3/167* (2013.01); *B60K 35/00* (2013.01); *G06F 3/02* (2013.01); *G06F 3/044* (2013.01); *B60K 35/10* (2024.01); *B60K 35/652* (2024.01); *B60K 2360/143* (2024.01)

(58) Field of Classification Search
CPC . G06F 3/02; G06F 3/167; G06F 3/044; B60K 35/00; B60K 35/10; B60K 35/652; B60K 2360/143
See application file for complete search history.

(56) References Cited

U.S. PATENT DOCUMENTS

2013/0305155 A1* 11/2013 Yoon .................... G06F 3/04847
715/716
2018/0329623 A1* 11/2018 Usami .................... B60K 35/10

FOREIGN PATENT DOCUMENTS

JP 2012-018587 A 1/2012

* cited by examiner

*Primary Examiner* — Deeprose Subedi
(74) *Attorney, Agent, or Firm* — Studebaker & Brackett PC

(57) ABSTRACT

An operation device includes a housing arranged on a center cluster located diagonally in front of a driver seat and a passenger seat of a vehicle, a left-side operation unit and a right-side operation unit arranged on a right side and a left side, respectively, of a front surface of the housing to receive an operation, a left-side operation detection unit and a right-side operation detection unit to detect an operation performed on the left-side operation unit and the right-side operation unit, respectively, a substrate on which the left-side and right-side operation detection units are arranged, and an output unit that outputs a sound in response to a received operation and is arranged on the substrate so as to be located between the left-side operation detection unit and the right-side operation detection unit at a position to equalize distances from the driver seat and the passenger seat.

11 Claims, 3 Drawing Sheets

OPERATION DEVICE COMPRISING A HOUSING ARRANGED ON A CENTER CLUSTER

CROSS-REFERENCE TO RELATED APPLICATIONS

The present patent application claims the priority of Japanese patent application No. 2022/047726 filed on Mar. 24, 2022, and the entire contents of Japanese patent application No. 2022/047726 are hereby incorporated by reference.

TECHNICAL FIELD

The present invention relates to an operation device.

BACKGROUND ART

An in-vehicle display device including a touch panel display and a speaker to generate a responding sound is known (see, e.g., Patent Literature 1).

The in-vehicle display device is configured to generate a responding sound from a speaker when an input position at which the touch panel display has received an input is within a responding sound region based on responding sound region data.

CITATION LIST

Patent Literature

Patent Literature 1: JP 2012/18587 A

SUMMARY OF THE INVENTION

In case of the in-vehicle display device that is configured such that, e.g., the touch panel display is thin and long and a housing has a corresponding shape, and when an electrostatic detection function is provided on one of the left and right sides of the housing and an output function to output a responding sound is separately provided on the other side to avoid interference between the electrostatic detection function and the output function, there is a problem that how the sound is heard is different depending on whether the driver seat is on the left or on the right.

It is an object of the invention to provide an operation device that can suppress a difference in how sound is heard due to a position of a driver seat.

An aspect of the invention provides an operation device, comprising:
  a housing arranged on a center cluster located diagonally in front of a driver seat and a passenger seat of a vehicle;
  a left-side operation unit arranged on a left side of a front surface of the housing to receive an operation;
  a right-side operation unit arranged on a right side of the front surface to receive an operation;
  a left-side operation detection unit to detect an operation performed on the left-side operation unit;
  a right-side operation detection unit to detect an operation performed on the right-side operation unit;
  a substrate on which the left-side operation detection unit and the right-side operation detection unit are arranged; and
  an output unit that outputs a sound in response to a received operation and is arranged on the substrate so as to be located between the left-side operation detection unit and the right-side operation detection unit at a position to equalize distances from the driver seat and the passenger seat.

Advantageous Effects of Invention

According to an embodiment of the invention, it is possible to suppress a difference in how sound is heard due to a position of a driver seat.

DETAILED DESCRIPTION OF THE INVENTION

Short Summary of the Embodiment

An operation device in the embodiment generally includes a housing arranged on a center cluster located diagonally in front of a driver seat and a passenger seat of a vehicle, a left-side operation unit arranged on a left side of a front surface of the housing to receive an operation, a right-side operation unit arranged on a right side of the front surface to receive an operation, a left-side operation detection unit to detect an operation performed on the left-side operation unit, a right-side operation detection unit to detect an operation performed on the right-side operation unit, a substrate on which the left-side operation detection unit and the right-side operation detection unit are arranged, and an output unit that outputs a sound in response to a received operation and is arranged on the substrate so as to be located between the left-side operation detection unit and the right-side operation detection unit at a position to equalize distances from the driver seat and the passenger seat.

The output unit of this operation device is arranged at a position to equalize the distances from the driver seat and the passenger seat. Therefore, as compared to when such a configuration is not adopted, a difference in how the sound is heard by the driver between when arranging the operation device in a right-hand drive vehicle having the driver seat and the steering wheel on the right side and when arranging in a left-hand drive vehicle having the driver seat and the steering wheel on the left side can be suppressed.

Embodiment

General Configuration of an Operation Device 1

Figure 1A:
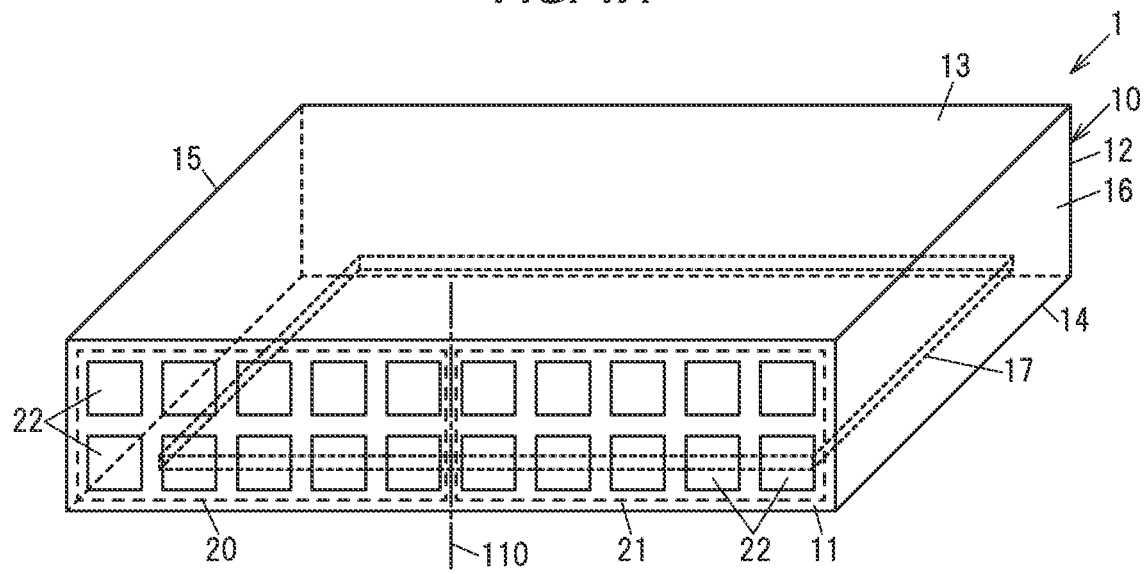
FIG. 1A is a diagram illustrating an example of an operation device.
Figure 1B:
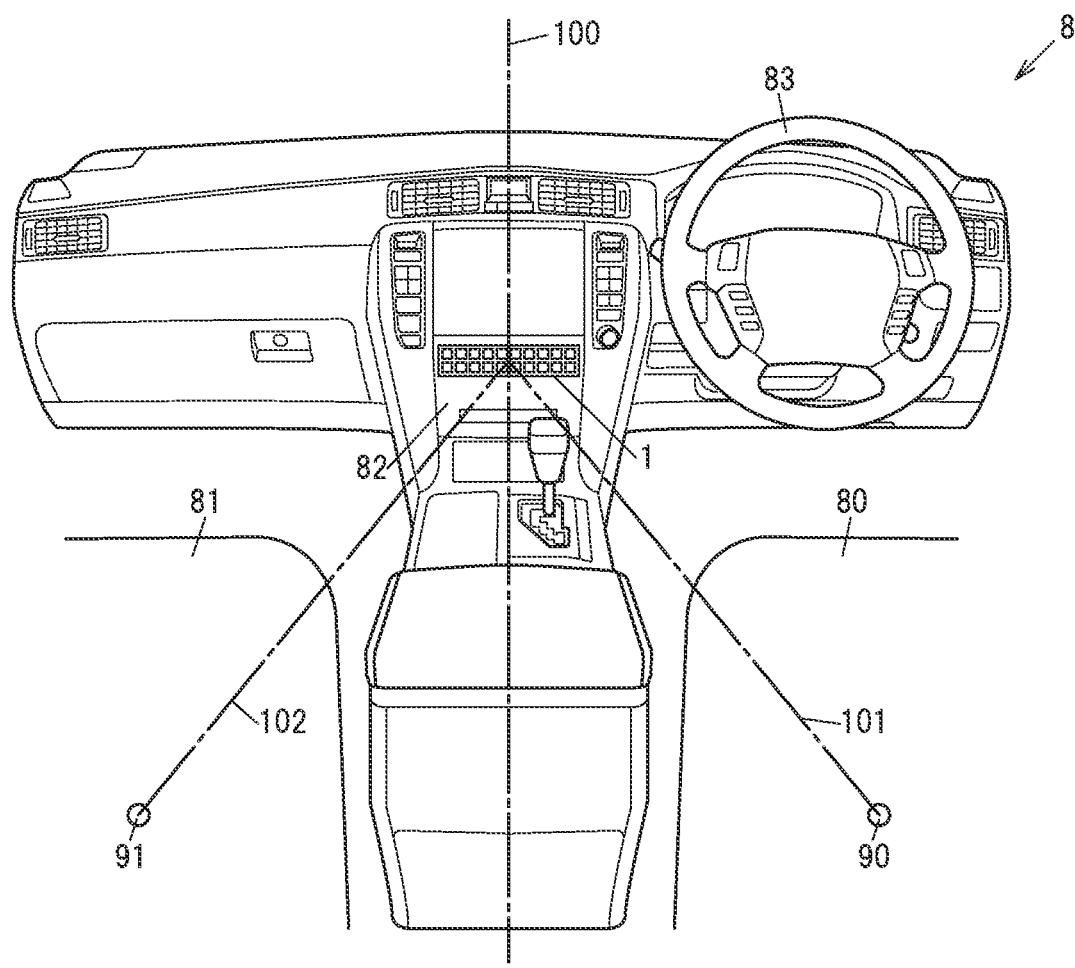
FIG. 1B is a diagram illustrating an example of the inside of a vehicle in which the operation device is arranged.
Figure 2A:
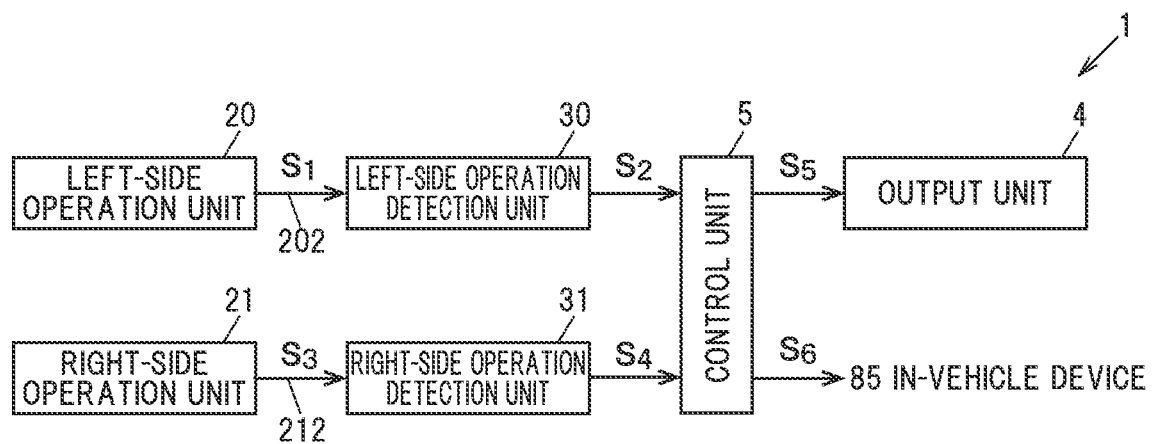
FIG. 2A is an example block diagram illustrating the operation device.
Figure 2B:
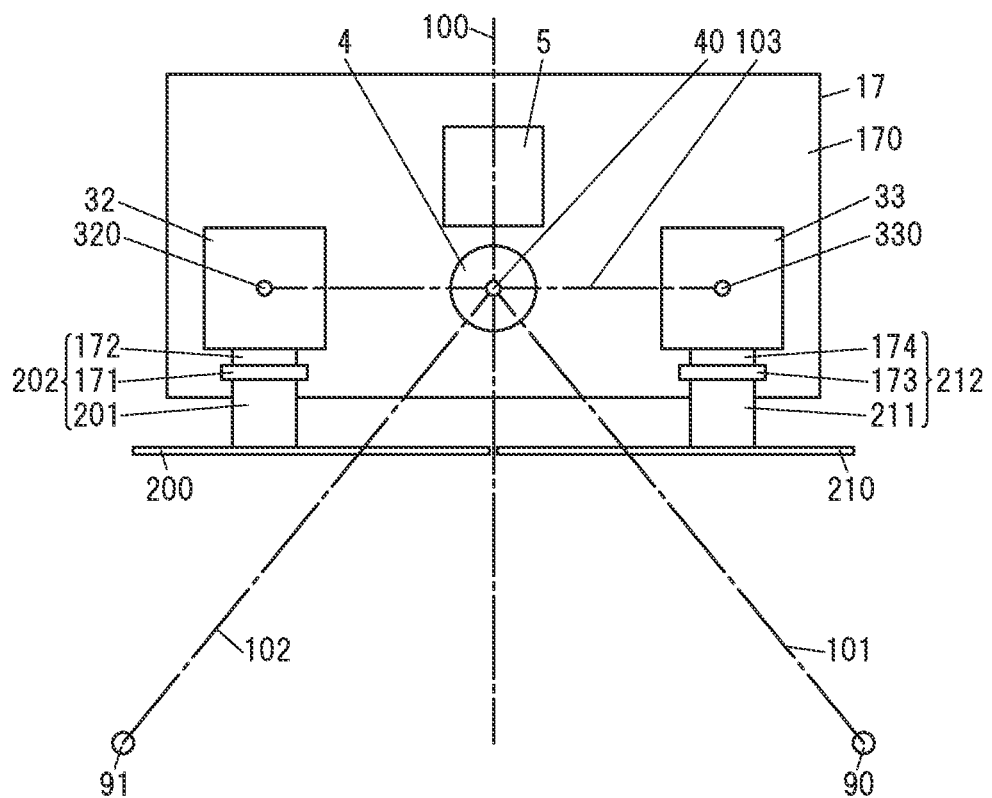
FIG. 2B is a diagram illustrating an example of a position of an output unit.
Figure 2C:
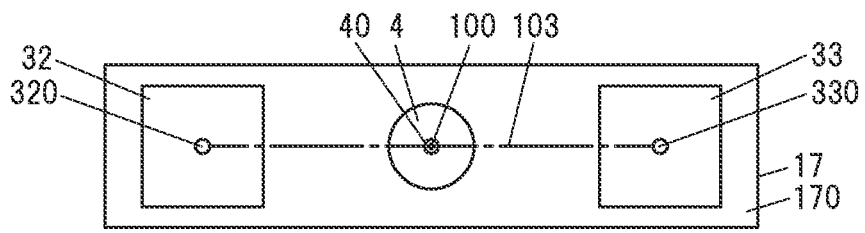
FIG. 2C shows an example of a position of a substrate.
Figure 3A:
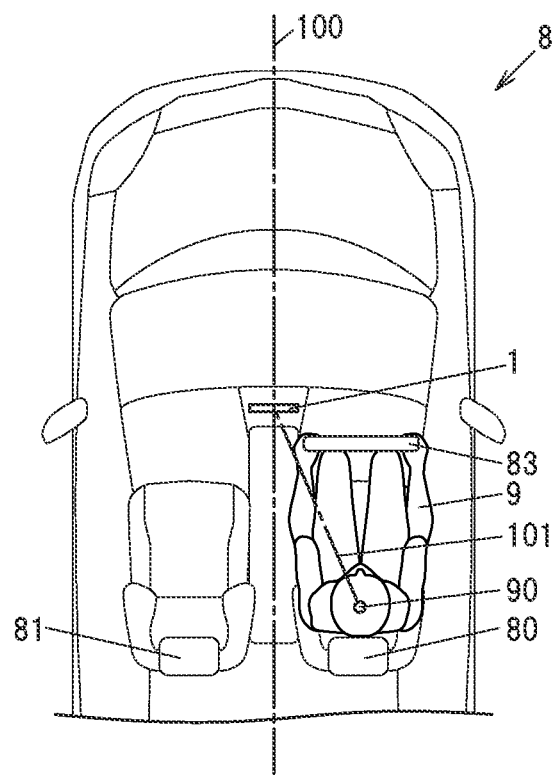
FIG. 3A is a diagram illustrating an example of a distance from the operation device to a driver in a right-hand drive vehicle.
Figure 3B:
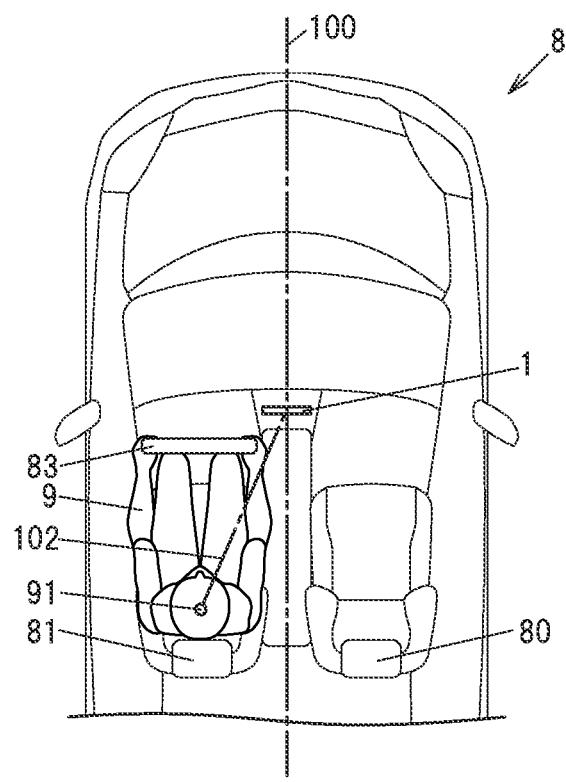
FIG. 3B is a diagram illustrating an example of a distance from the operation device to a driver in a left-hand drive vehicle.

FIG. 1A is a diagram illustrating an example of an operation device in an embodiment, and FIG. 1B is a diagram illustrating an example of the inside of a vehicle in which the operation device is arranged. FIG. 2A is an example block diagram illustrating the operation device in the embodiment, FIG. 2B is a diagram illustrating an example of a position of an output unit, and FIG. 2C shows an example of a position of a substrate. FIG. 3A is a diagram illustrating an example of a distance from the operation device in the embodiment to a driver in a right-hand drive vehicle, and FIG. 3B is a diagram illustrating an example of a distance from the operation device to a driver in a left-hand drive vehicle.

The right-hand drive vehicle is a vehicle in which a steering wheel 83 is on the right side, i.e., the driver seat is a right seat 80, as shown in FIG. 3A. The left-hand drive vehicle is a vehicle in which the steering wheel 83 is on the left side, i.e., the driver seat is a left seat 81, as shown in FIG. 3B.

In FIGS. 1B, 2B, 3A and 3B, a position of a head center 90 of a driver 9 seated in the right seat 80 and a position of a head center 91 of the driver 9 seated in the left seat 81 are schematically shown as white circles. A center line 100, a distance 101, a distance 102 and a straight line 103 shown in FIGS. 1B and 2B are those when a vehicle 8 is viewed from above.

In each drawing of the embodiment described below, a scale ratio or shape may be different from an actual ratio or shape. In addition, in FIG. 2A, flows of main signals and information are indicated by arrows.

As shown in FIGS. 1A and 1B, the operation device 1 generally includes a housing 10 arranged on a center cluster 82 located diagonally in front of driver seat and a passenger seat of the vehicle 8, a left-side operation unit 20 arranged on a left side of a front surface 11 of the housing 10 to receive an operation, a right-side operation unit 21 arranged on a right side of the front surface 11 to receive an operation, a left-side operation detection unit 30 to detect an operation performed on the left-side operation unit 20, a right-side operation detection unit 31 to detect an operation performed on the right-side operation unit 21, a substrate 17 on which the left-side operation detection unit 30 and the right-side operation detection unit 31 are arranged, and an output unit 4 that outputs a sound in response to a received operation and is arranged on the substrate 17 so as to be located between the left-side operation detection unit 30 and the right-side operation detection unit 31 at a position to equalize the distances from the driver seat and the passenger seat.

In case of a right-hand drive vehicle, the driver seat is the right seat 80 and the passenger seat is the left seat 81. In the case of a left-hand drive vehicle, the driver seat is the left seat 81 and the passenger seat is the right seat 80.

The left-side operation unit 20 and the right-side operation unit 21 in the present embodiment are configured to receive a touch operation. Thus, the left-side operation detection unit 30 and the right-side operation detection unit 31 are configured to detect a touch operation performed on the left-side operation unit 20 and the right-side operation unit 21 using a capacitive sensing method.

The left-side operation detection unit 30 and the right-side operation detection unit 31 are provided on a left-side semiconductor element 32 and a right-side semiconductor element 33 shown in FIG. 2B.

The output unit 4 is arranged so that a center 40 coincides with a midpoint of the straight line 103 connecting an element center 320 of the left-side semiconductor element 32 to an element center 330 of the right-side semiconductor element 33, as shown in FIG. 2B.

As shown in FIGS. 2A and 2B, the operation device 1 includes a control unit 5 that is arranged on the substrate 17, is electrically connected to the left-side operation detection unit 30 and the right-side operation detection unit 31, and controls the output unit 4 to output a sound in response to a touch operation detected by the left-side operation detection unit 30 and the right-side operation detection unit 31.

As shown in FIG. 2A, the operation device 1 controls an in-vehicle device 85 of the vehicle 8. As an example, the control unit 5 of the operation device 1 of the present embodiment is electrically connected to an air conditioner, as the in-vehicle device 85, of the vehicle 8, and is configured to control the air conditioner based on a received touch operation. The air conditioner performs, e.g., adjustment of set temperature, adjustment of air volume, and switching of vents based on a touch operation performed on the operation device 1.

The in-vehicle device 85 is not limited to the air conditioner and may be a vehicle control device that controls settings for the entire vehicle and self-driving functions, an air conditioner that adjusts temperature inside the vehicle, a navigation device that shows a map of the current location and guides to a destination, a display device that displays images, or a music and video playback device to play back music and video, etc.

Configuration of the Housing 10

As shown in FIG. 1A, the housing 10 has a shape which is low in height and long in the left-right direction of the vehicle 8, so as to be able to be arranged on the center cluster 82 where the installation space is limited. The housing 10 is arranged so that the front surface 11 is exposed from the center cluster 82.

On this front 11, plural touch switches 22 of the left-side operation unit 20 and the right-side operation unit 21 are lined up in upper and lower rows. The operation device 1 may alternatively be configured such that a display portion is provided in the center of the front surface 11 and the left-side operation unit 20 is arranged on the left side of the display portion and the right-side operation unit 21 on the right side.

Configuration of the Left-Side Operation Unit 20 and the Right-Side Operation Unit 21

As an example, the left-side operation unit 20 and the right-side operation unit 21 each include plural rectangular touch switches 22, as shown in FIG. 1A. The touch switch 22 is switched between on and off by a touch operation. The touch switch 22 includes, e.g., a rectangular plate-shaped detection electrode formed of a conductive metal material such as copper.

As a modification, the left-side operation unit 20 and the right-side operation unit 21 may also include a rotary operation unit that receives a dial rotation operation or a slide operation unit that receives a slide operation, etc., in addition to the touch switches 22.

As shown in FIG. 1A, the left-side operation unit 20 has plural touch switches 22 surrounded by a dotted line on the left side of a boundary line 110 indicating the boundary between the right and left sides of the front surface 11. The left-side operation unit 20 includes five touch switches 22 in the upper row and five touch switches 22 in the lower row, as an example.

As shown in FIG. 2B, the left-side operation unit 20 has a touch sheet 200 on which the touch switches 22 on the upper and lower rows are integrated, and a flexible cable 201 electrically connected to the left-side operation detection unit 30 through a connector 171.

The right-side operation unit 21 has plural touch switches 22 surrounded by a dotted line on the right side of the boundary line 110 of the front surface 11. The right-side operation unit 21 includes five touch switches 22 in the upper row and five touch switches 22 in the lower row, as an example.

As shown in FIG. 2B, the right-side operation unit 21 has a touch sheet 210 on which the touch switches 22 on the upper and lower rows are integrated, and a flexible cable 211 electrically connected to the right-side operation detection unit 31 through a connector 173.

The flexible cables 201 and 211 are configured such that wirings electrically connected to the detection electrodes of the touch switches 22 are formed on a film as a base.

As shown in FIG. 2A, the left-side operation unit 20 outputs an electrostatic capacitance signal $S_1$ to the left-side operation detection unit 30 through the flexible cable 201. The right-side operation unit 21 outputs an electrostatic capacitance signal $S_3$ to the right-side operation detection unit 31 through the flexible cable 211.

Configuration of the Substrate 17

The substrate 17 is a plate-shaped rigid substrate having a rectangular shape, as an example. The substrate 17 is arranged parallel to a lower surface 14 of the housing 10, as shown in FIGS. 1A and 2B. The left-side semiconductor element 32, the right-side semiconductor element 33, the output unit 4 and the control unit 5 are arranged on a mounting surface 170 of the substrate 17.

As shown in FIG. 2C, the substrate 17 as a modification is arranged parallel to the front surface 11 of the housing 10, as an example. This substrate 17 can have an elongated shape since the output unit 4 is arranged on the straight line 103 connecting the element center 320 of the left-side semiconductor element 32 to the element center 330 of the right-side semiconductor element 33 so that the center 40 coincides with the midpoint between the element center 320 and the element center 330. Thus, as compared to when such a configuration is not adopted, the control unit 1 can be made more compact by reducing not only a length in the height direction but also a length from the front surface 11 to a back surface 12.

Configuration of the Left-Side Operation Detection Unit 30 and the Right-Side Operation Detection Unit 31

The left-side operation detection unit 30 is configured to charge each detection electrode of the left-side operation unit 20, read an electric charge from the charged detection electrode, and compare capacitance calculated from the read electric charge with a predetermined threshold value to determine whether or not a touch operation has been performed.

Likewise, the right-side operation detection unit 31 is configured to charge each detection electrode of the right-side operation unit 21, read electric charge from the charged detection electrode, and compare capacitance calculated from the read electric charge with a predetermined threshold value to determine whether or not a touch operation has been performed.

The left-side operation detection unit 30 and the right-side operation detection unit 31 are configured, e.g., to read electric charges while periodically switching connection to the plural touch switches 22.

The left-side operation detection unit 30 determines a touch operation based on the electrostatic capacitance signal $S_1$ read from the left-side operation unit 20, generates determination information $S_2$ including information about the touch switch 22 where a touch operation has been detected, and outputs the determination information $S_2$ to the control unit 5.

The right-side operation detection unit 31 determines a touch operation based on the electrostatic capacitance signal $S_3$ read from the right-side operation unit 21, generates determination information $S_4$ including information about the touch switch 22 where a touch operation has been detected, and outputs the determination information $S_4$ to the control unit 5.

The left-side operation detection unit 30 and the right-side operation detection unit 31 in the present embodiment detect a touch operation using the self-capacitance method, but it is not limited thereto. Touch operation may be detected using a mutual capacitance method in which a two-dimensional touch position is detected by detection electrodes crossing vertically and horizontally.

Although the left-side operation unit 20, the left-side operation detection unit 30, the right-side operation unit 21 and the right-side operation detection unit 31 in the present embodiment are configured to detect a touch operation on the touch switch 22 using a capacitive sensing method, it is not limited thereto. As modifications, the left-side operation unit 20, the left-side operation detection unit 30, the right-side operation unit 21 and the right-side operation detection unit 31 may, e.g., be configured to detect pressure applied to the touch switch 22 due to a touch operation, or may be configured to include a microswitch that is turned on and off due to a touch operation.

When detecting pressure, the left-side operation unit 20 and the right-side operation unit 21 are configured as pressure sensor sheets that detect applied pressure for each of the touch switches 22, and the left-side operation detection unit 30 and the right-side operation detection unit 31 are configured to determine a touch operation based on pressure which is not less than a threshold value.

When a touch operation is determined based on on/off of a microswitch, the left-side operation unit 20 and the right-side operation unit 21 are configured to include a microswitch, and the left-side operation detection unit 30 and the right-side operation detection unit 31 determine the touch switch 22 where the touch operation has been detected, based on an output signal from the microswitch.

A first transmission path 202, which electrically connects the left-side operation unit 20 to the left-side operation detection unit 30 to transmit a signal, and a second transmission path 212, which electrically connects the right-side operation unit 21 to the right-side operation detection unit 31 to transmit a signal, are paths equal to each other.

As shown in FIG. 2B, the first transmission path 202 is a transmission path from the left-side operation unit 20 to the left-side semiconductor element 32 on which the left-side operation detection unit 30 is provided, i.e., a transmission path including the flexible cable 201, the connector 171 and a wiring group 172. The wiring group 172 is composed of plural wirings that are provided on the substrate 17 and electrically connect the connector 171 to the left-side semiconductor element 32.

As shown in FIG. 2B, the second transmission path 212 is a transmission path from the right-side operation unit 21 to the right-side semiconductor element 33 on which the right-side operation detection unit 31 is provided, i.e., a transmission path including the flexible cable 211, the connector 173 and a wiring group 174. The wiring group 174 is composed of plural wirings that are provided on the substrate 17 and electrically connect the connector 173 to the right-side semiconductor element 33.

When the left operation section 20 and the right-side operation unit 21 have the same configuration, the left-side operation detection unit 30 and the right-side operation detection unit 31 can have the same circuit configuration, hence, the same semiconductor element can be used for the left-side semiconductor element 32 and the right-side semiconductor element 33.

Configuration of the Output Unit 4

The output unit 4 is a circuit including a speaker composed of a piezoelectric element as an example, but may be a circuit including a speaker composed of a voice coil. Based on a control signal $S_5$ output from the control unit 5, the output unit 4 outputs a feedback sound indicating that the touch operation has been received. The center 40 of the output unit 4 is the center of the speaker. The sound to be output is, as an example, a feedback sound indicating that a touch operation has been received, but it is not limited thereto.

As an example, the housing 10 may have plural small through-holes on the back surface 12, an upper surface 13 and the lower surface 14 or have plural small through-holes on side surfaces 15 and 16 so that the sound of the output unit 4 can be easily output to the outside.

Configuration of the Control Unit 5

The control unit 5 is, e.g., a microcomputer composed of a CPU (Central Processing Unit) performing calculation and processing, etc., of the acquired data according to a stored program, and a RAM (Random Access Memory) and a ROM (Read Only Memory) as semiconductor memories, etc. The ROM stores, e.g., a program for operation of the control unit 5. The RAM is used as, e.g., a storage area to temporarily store calculation results, etc. The control unit 5 also has, inside thereof, a means to generate a clock signal and operates based on the clock signal.

As shown in FIG. 2B, the control unit 5 is arranged on the mounting surface 170 of the substrate 17. As an example, the control unit 5 is arranged so as to equalize the distances from the left-side semiconductor element 32 and the right-side semiconductor element 33.

Based on the determination information $S_2$ acquired from the left-side operation detection unit 30 and the determination information $S_4$ acquired from the right-side operation detection unit 31, the control unit 5 generates operation information S6 including information about the touch switch 22 where a touch operation has been detected, and outputs the operation information S6 to the in-vehicle device 85.

The Distance 101 and the Distance 102

In the operation device 1, the plural touch switches 22 are separated into those for the left-side operation unit 20 and those for the right-side operation unit 21, and the operation detection units are separately arranged on the left-side semiconductor element 32 and the right-side semiconductor element 33 on the substrate 17, hence, the difference in how the sound is heard can be suppressed by arranging the output unit 4 along the center line 100.

In particular, by locating the center 40 at least on the center line 100, the output unit 4 is arranged such that the distance 101 from the head center 90 of the driver 9 to the center 40 when the driver seat is the right seat 80 is equal to the distance 102 from the head center 91 of the driver 9 to the center 40 when the driver seat is the left seat 81, as shown in FIG. 2B.

As shown in FIGS. 1B, 2B, 3A and 3B, the center line 100 is a straight line passing through the center of the vehicle 8 in the left-right direction and also passing through the front and the rear. From any point on the center line 100, the distance 101 to the head center 90 of the driver 9 seated in the driver seat of a right-hand drive vehicle is equal to the distance 102 to the head center 91 of driver 9 seated in the driver seat of a left-hand drive vehicle.

Thus, by arranging the output unit 4 so that the center 40 is located on the center line 100, the distance 101 to the driver 9 of the right-hand drive vehicle is equal to the distance 102 to the driver 9 of the left-hand drive vehicle, hence, the difference in how the sound is heard is suppressed.

When the substrate 17 is arranged parallel to the front surface 11, the output unit 4 is arranged so that the center 40 coincides with a point which is an intersection of the center line 100 and the substrate 17 and is also the midpoint of the straight line 103 connecting the element center 320 to the element center 330, as shown in FIG. 2C.

Effects of the Embodiment

The operation device 1 in the present embodiment can suppress the difference in how the sound is heard due to the position of the driver seat. In particular, even if the vehicle model is the same, the vehicle 8 is manufactured as right-hand drive and left-hand drive as shown in FIGS. 3A and 3B, depending on the country where the vehicle is sold. If the operation device 1 is configured such that the output unit 4 is arranged on either the left or right side, the distance from the output unit 4 to the driver differs between the right-hand drive vehicle and left-hand drive vehicle, causing a difference in how the sound is heard.

However, since the operation device 1 is configured such that the output unit 4 is arranged at the position at which the distance 101 from the right seat 80 is equal to the distance 102 from the left seat 81, the difference in how the sound is heard can be suppressed in both a right-hand drive vehicle and a left-hand drive vehicle.

In the operation device 1, the output unit 4 is arranged so that the center 40 is located on the center line 100. Therefore, the left-side semiconductor element 32 and the right-side semiconductor element 33 can be arranged on the left and right sides with the output unit 4 in-between, and the first transmission path 202 from the left-side operation unit 20 to the left-side semiconductor element 32 can be of the same length as the second transmission path 212 from the right-side operation unit 21 to the right-side semiconductor element 33. In the operation device 1, the left-side operation detection unit 30 and the right-side operation detection unit 31 which are circuits to detect touch operations are arranged at a distance from the output unit 4 which is likely to interfere with these circuits so that interference is suppressed, and the first transmission path 202 and the second transmission path 212 can be shorter than when the touch sheet is not divided into left and right sides. Therefore, it is less likely to be affected by external noise, etc., and erroneous determination of touch detection can be suppressed.

By dividing the circuit to detect touch operation into the small left-side operation detection unit 30 and the small right-side operation detection unit 31, the left-side operation detection unit 30 and the small right-side operation detection unit 31 can be arranged in a small space without interfering with the output unit 4. Therefore, as compared to when such a configuration is not adopted, the operation device 1 can be easily reduced in size and made thinner in the height direction, i.e., low in height.

The operation device 1 can suppress the difference in how the sound is heard due to the position of the driver seat, even when the device is used alone without using a speaker provided in the vehicle 8.

Although some embodiment and modifications of the invention have been described, these embodiment and modifications are merely examples and the invention according to claims is not to be limited thereto. These new embodiment and modifications may be implemented in various other forms, and various omissions, substitutions and changes, etc., can be made without departing from the gist of the invention. In addition, not all combinations of the features described in these embodiment and modifications are necessary to solve the problem of the invention. Further, these embodiment and modifications are included within the scope and gist of the invention and also within the invention described in the claims and the range of equivalency.

REFERENCE SIGNS LIST

1 OPERATION DEVICE
4 OUTPUT UNIT
5 CONTROL UNIT
8 VEHICLE
10 HOUSING
11 FRONT SURFACE
17 SUBSTRATE
20 LEFT-SIDE OPERATION UNIT
21 RIGHT-SIDE OPERATION UNIT
22 TOUCH SWITCH
30 LEFT-SIDE OPERATION DETECTION UNIT
31 RIGHT-SIDE OPERATION DETECTION UNIT
32 LEFT-SIDE SEMICONDUCTOR ELEMENT
33 RIGHT-SIDE SEMICONDUCTOR ELEMENT
40 CENTER
80 RIGHT SEAT
81 LEFT SEAT
82 CENTER CLUSTER
85 IN-VEHICLE DEVICE
100 CENTER LINE
101 DISTANCE
102 DISTANCE
103 STRAIGHT LINE
202 FIRST TRANSMISSION PATH
212 SECOND TRANSMISSION PATH
320 ELEMENT CENTER
330 ELEMENT CENTER

The invention claimed is:

1. An operation device, comprising:
a housing arranged on a center cluster located diagonally in front of a driver seat and a passenger seat of a vehicle;
a left-side operation unit arranged on a left side of a front surface of the housing to receive an operation;
a right-side operation unit arranged on a right side of the front surface to receive an operation;
a left-side operation detection unit to detect an operation performed on the left-side operation unit;
a right-side operation detection unit to detect an operation performed on the right-side operation unit;
a substrate on which the left-side operation detection unit and the right-side operation detection unit are arranged; and
an output unit that outputs a sound in response to a received operation and is fixedly arranged on the substrate so as to be located between the left-side operation detection unit and the right-side operation detection unit at a position to equalize distances from the driver seat and the passenger seat such that a difference in how the sound is heard by a passenger in the driver seat or the passenger seat is suppressed.

2. The operation device according to claim 1, wherein a first transmission path electrically connecting the left-side operation unit to the left-side operation detection unit to transmit a signal and a second transmission path electrically connecting the right-side operation unit to the right-side operation detection unit to transmit a signal comprise paths equal to each other.

3. The operation device according to claim 1, wherein the left-side operation unit and the right-side operation unit receive a touch operation, and wherein the left-side operation detection unit and the right-side operation detection unit detect a touch operation performed on the left-side operation unit and the right-side operation unit using a capacitive sensing method.

4. The operation device according to claim 1, wherein the left-side operation detection unit and the right-side operation detection unit are provided on a left-side semiconductor element and a right-side semiconductor element, and wherein the output unit is arranged so that a center thereof coincides with a midpoint of a straight line connecting element centers of the left-side semiconductor element and the right-side semiconductor element.

5. The operation device according to claim 1, further comprising a control unit that is arranged on the substrate, is electrically connected to the left-side operation detection unit and the right-side operation detection unit, and controls the output unit to output a sound in response to a touch operation detected by the left-side operation detection unit and the right-side operation detection unit.

6. The operation device according to claim 5, wherein the control unit is electrically connected to an air conditioner of the vehicle and controls the air conditioner based on a received touch operation.

7. The operation device according to claim 1, wherein the control unit is disposed along a center line passing through a center of the vehicle so as to equalize the distances.

8. The operation device according to claim 1, wherein a center of the control unit is located on a center line passing through a center of the vehicle so as to equalize the distances.

9. The operation device according to claim 4, wherein the control unit is disposed so as to equalize distances from the left-side semiconductor element and the right-side semiconductor element.

10. The operation device according to claim 1, wherein the substrate is disposed parallel to the front surface of the housing, and is elongated along a left-right axis.

11. An operation device, comprising:
a housing arranged on a center cluster located diagonally in front of a driver seat and a passenger seat of a vehicle;

a left-side operation unit arranged on a left side of a front surface of the housing to receive an operation;
a right-side operation unit arranged on a right side of the front surface to receive an operation;
a left-side operation detection unit to detect an operation performed on the left-side operation unit;
a right-side operation detection unit to detect an operation performed on the right-side operation unit;
a substrate on which the left-side operation detection unit and the right-side operation detection unit are arranged; and
an output unit that outputs a sound in response to a received operation and is fixedly arranged on the substrate so as to be located between the left-side operation detection unit and the right-side operation detection unit at a position to equalize distances from the driver seat and the passenger seat such that a difference in how the sound is heard by a passenger in the driver seat or the passenger seat is suppressed,
wherein the left-side operation detection unit and the right-side operation detection unit are provided on a left-side semiconductor element and a right-side semiconductor element, and
wherein the output unit is arranged so that a center thereof coincides with a midpoint of a straight line connecting element centers of the left-side semiconductor element and the right-side semiconductor element, and
wherein the substrate has an elongated shape along a left-right axis.

* * * * *